July 30, 1968 G. R. PRINGLE 3,394,844

VENT VALVE FOR CRYOGENIC CARGO TANKS

Filed Aug. 5, 1966

G. R. PRINGLE   INVENTOR

BY Donald F. Wolters

PATENT ATTORNEY

United States Patent Office 3,394,844
Patented July 30, 1968

3,394,844
VENT VALVE FOR CRYOGENIC CARGO TANKS
Gordon R. Pringle, Farnham, England, assignor to Esso Research and Engineering Company, a corporation of Delaware
Filed Aug. 5, 1966, Ser. No. 570,646
5 Claims. (Cl. 220—88)

ABSTRACT OF THE DISCLOSURE

The instant disclosure is directed to a vent valve for the venting of a cryogenic gas in an upward direction while preventing external moisture from reaching the opening of the vent pipe where it could freeze and result in valve sticking. Another feature of the valve of the instant invention is to provide for relieving any pressure build-up in the vent pipe and in any storage tank associated with the vent pipe.

---

The invention relates in general to venting devices and more particularly to new and improved venting devices which provide for upward flow of the vented material while still preventing foreign material from entering the vent pipe.

The principles of the invention are particularly applicable to the venting of tanks containing cryogenic cargoes such as liquefied natural gas (LNG) and the like and accordingly the invention has been described in this context in the accompanying specification. It is to be understood however that the features of the instant invention are readily adaptable to a wide variety of venting applications.

Accordingly, an object of the invention is to provide for venting of a gas in an upward direction while preventing external moisture from reaching the opening of the vent pipe where it could freeze and result in valve sticking.

Another object of the invention is to provide for relieving any pressure build-up in the vent line and its associated storage tank.

Still another object is to prevent any foreign matter from entering the vent pipe. Other objects and a fuller understanding of the invention may be had by referring to the following description and claims taken in conjunction with the accompanying drawings in which:

Figure 1:
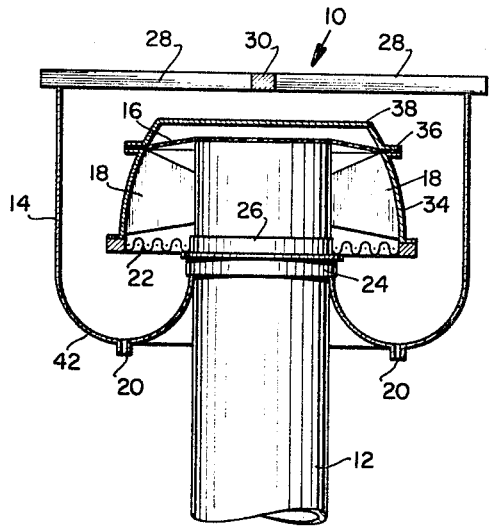
FIG. 1 shows a cross-sectional view of a vent pipe equipped with the new and improved venting device with the vent valve shown in its normal closed position.

Referring to FIG. 1, the improved vent valve shown generally at 10 is positioned over the open end of a vent pipe 12, the valve outer casing member 14 being fixed to the walls of vent pipe 12. Casing 14 is fabricated with generally cylindrical side walls and a bottom section 42, which is generally toroidal in shape. The bottom section 42 is equipped with a plurality of drain holes 20, which prevent the build-up of rain or other moisture within the interior portion of the casing.

The movable portion of the valve consists of an inverted cup-shaped member 34, equipped with a flexible diaphragm 16 located within and adjacent the closed end of the cup and held in place by clamping means 36. The cup member is maintained concentric with the axis of the vent pipe by radial guiding vanes 18, whose outer ends are fixed to the interior of the cup member and whose inner ends slidably contact the walls of vent pipe 12. The inverted cup member is also provided with an annular flame arresting screen 22, whose outer periphery is fastened across the mouth of the cup member and whose inner periphery is attached to a collar 26, movably mounted on the vent pipe.

It is to be appreciated that flame screen 22 may also advantageously be fastened across the opening of vent pipe 12, in which case movable collar 26 could be connected by rod-like members to the rim of the movable cup portion.

During normal operation the valve is designed to operate such that flexible diaphragm 16 rests on the open end of the vent pipe and movable collar 26 rests on the stop collar 24. The gas to be vented then escapes under flexible diaphragm 16 and is deflected upwardly as indicated by the arrows P, by the toroidally shaped bottom portion 42 of valve casing 14. It is to be appreciated that this upward deflection of the vented gases is of particular importance where gases at low temperatures are involved. This is because the relative difference in density between the gas and air is not as great as when both are at atmospheric temperature and consequently the cold gas may have a tendency to collect downwardly and this, of course, could present a serious hazard to safety. An additional feature of the design is that rain and other moisture are prevented from reaching the movable portion of the valve thus preventing ice formation and subsequent valve freezing.

In keeping with established practices for pressure relief valves, it is desirable to minimize the back pressure represented by the resistance to movement of the cup portion 34 and its associated members. Consequently, the weight of the moving portion of the valve should be kept to a minimum.

To accomplish this it is preferable that cup member 34, guiding vanes 18, and movable collar 26 be fabricated of aluminum. A preferred material for flexible diaphragm 16 is a solid fluorocarbon polymer of the Teflon type. If desired a further reduction in the weight of the movable portion of the valve may be obtained by positioning flame screen 22 across the opening of vent pipe 12, as earlier indicated.

Figure 2:
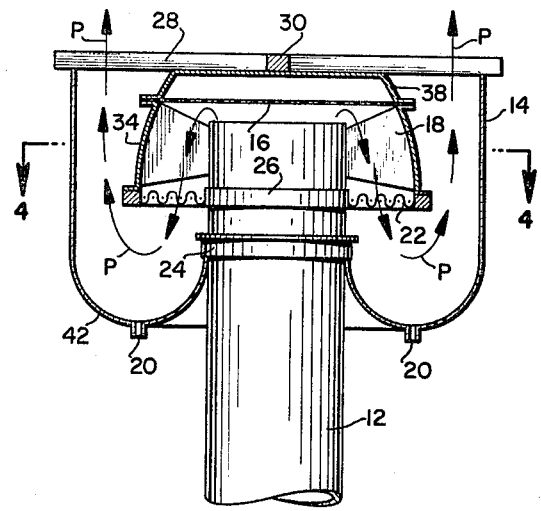
FIG. 2 is a cross-sectional view of the vent pipe and the improved venting device with the vent portion opened to its maximum position.
Figure 3:
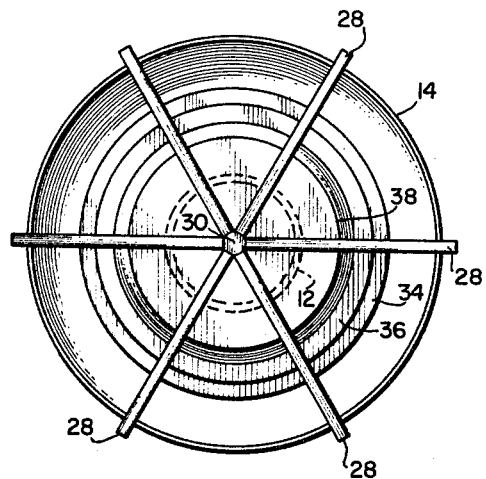
FIG. 3 is a top plan view of the improved venting device shown in FIGS. 1 and 2.
Figure 4:
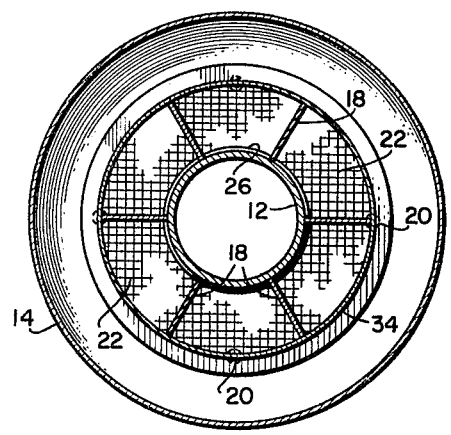
FIG. 4 shows a cross-sectional view taken along the line 4—4 of FIG. 2.

Referring to FIG. 2, the cup member 34 is shown in its most upward position. The cup is in this position when the pressure in the vent line increases and a larger discharge of gas is required. The increase in pressure in the vent line causes the movable cup portion to rise along vent pipe 12 until its top 38 abutts the stop means 28 fastened to the top of the valve outer casing 14. The configuration of stop means 28 may be seen to better advantage in FIG. 3, where it is shown to be comprised of a series of radial arms 28, whose inner ends are fixed at a central hub 30 and whose outer ends are attached to the top of the sides of the valve casing 14.

As is FIG. 1, the flow path taken by the vented gases is indicated by the arrows designated P.

When the excess pressure in the tank is relieved, the inverted cup portion 34 returns by gravity to its normal operating position shown in FIG. 1.

Although this invention has been described with a certain degree of particularity, it is to be understood that the present disclosure has been made by way of example and that obviously changes in the details of construction and arrangement of parts may be resorted to without departing from the spirit and the scope of the invention as hereinafter claimed.

What is claimed is:

1. A vent head for a vent pipe comprising in combination an inverted cup member fitted with a flexible diaphragm located adjacent the closed end of said cup member, said cup member having a larger diameter than said vent pipe and axially movably mounted on the end portion of said vent pipe, means for limiting the vertical travel of said inverted cup member, and an outer casing means having a toroidally shaped bottom section to deflect the vented gases in an upward direction.

2. A vent head for discharging gases to the atmosphere from the upper end of a substantially vertically oriented vent pipe comprising in combination:
(a) an inverted cup member having a diameter larger than the diameter of said vent pipe;
(b) a flexible diaphragm located within and adjacent the closed end of said cup;
(c) guiding means for slidably mounting said cup member on said vent pipe and maintaining said cup member in axial spaced relation to said vent pipe;
(d) said guiding means including a plurality of radially disposed vanes whose outward ends are affixed to the inner surface of said inverted cup member and whose inner ends slidably contact said vent pipe;
(e) a collar movably mounted on said vent pipe;
(f) an annular flame arresting screen located downwardly of said flexible diaphragm having its outer periphery fastened across the mouth of said inverted cup portion and having its inner periphery fastened to said collar;
(g) an outer casing means for reversing the direction of the downwardly flowing vented gas issuing from said inverted cup member to an upwardly flowing direction which is substantially parallel to the flow of gas in the vent pipe, said means comprising a vertical side portion of generally cylindrical casing shape and a bottom portion of generally toroidal shape;
(h) a plurality of drain holes located in the bottom portion of said outer casing means, said drain holes acting to prevent accumulation of water within said casing means;
(i) a top means for said outer casing means, said top means comprising a series of radial arms whose inner ends meet at a central hub and whose outer ends are affixed to the top of the vertical walls of said outer casing means; and
(j) means for affixing said outer casing means to said vent pipe so that said outer casing means encloses said inverted cup member.

3. The vent head of claim 1 wherein the flexible diaphragm is fabricated of a solid fluorocarbon polymer.

4. The vent head of claim 2 wherein the flexible diaphragm is fabricated of a solid fluorocarbon polymer.

5. A vent head for a substantially vertical vent pipe terminating in an upper end, comprising in combination an inverted cup member fitted with flexible seat means located interior of and adjacent the closed end of said cup member, said cup member having a diameter larger than said vent pipe and being mounted to be axially movable on the upper end of said vent pipe, means for limiting the vertical travel of said inverted cup member and an outer casing means having a toroidally shaped bottom section to deflect the vented gases in an upward direction.

References Cited
UNITED STATES PATENTS

| | | | |
|---|---|---|---|
| 1,157,685 | 10/1915 | Fryer | 220—89 |
| 1,302,318 | 4/1919 | Crompton | 220—88 |
| 2,691,464 | 10/1954 | Lisciani | 220—88 |

RAPHAEL H. SCHWARTZ, *Primary Examiner.*